(No Model.)
J. C. MILLER.
CLUTCH.
No. 449,378. Patented Mar. 31, 1891.
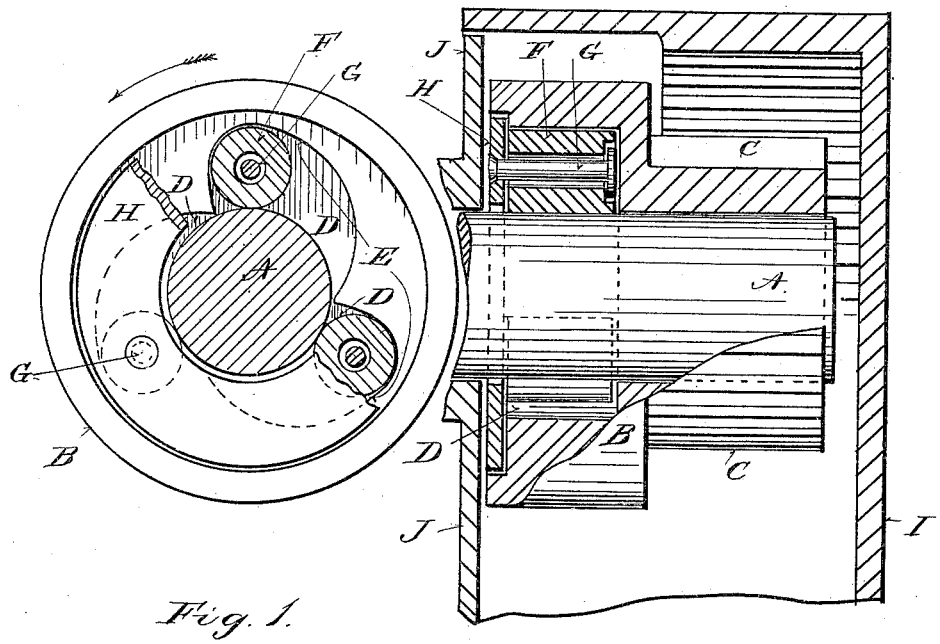
Fig. 1.
Fig. 2.
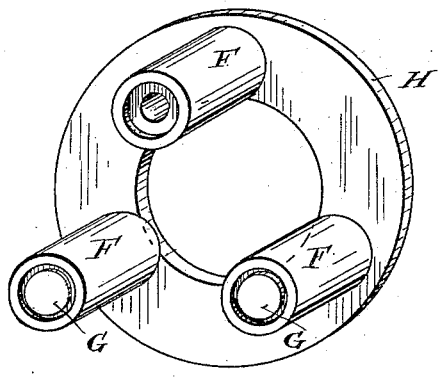
Fig. 3.
WITNESSES:
H. M. Plaisted
Warren Hull
INVENTOR
John C. Miller,
BY H. A. Toulmin.
HIS ATTORNEY.

UNITED STATES PATENT OFFICE.

JOHN C. MILLER, OF SPRINGFIELD, OHIO, ASSIGNOR TO THE THOMAS MANUFACTURING COMPANY, OF SAME PLACE.

CLUTCH.

SPECIFICATION forming part of Letters Patent No. 449,378, dated March 31, 1891.

Application filed December 15, 1890. Serial No. 374,748. (No model.)

*To all whom it may concern:*

Be it known that I, JOHN C. MILLER, a citizen of the United States, residing at Springfield, in the county of Clark and State of Ohio, have invented certain new and useful Improvements in Clutches, of which the following is a specification, reference being had therein to the accompanying drawings.

My invention relates to certain new and useful improvements in clutches, and has reference to improvements upon gripping-pieces or rolls shown in the application of Daniel B. Hiser, Serial No. 374,716, filed December 15, 1890, whereby they are conveniently supported in their operative position within a clutch of the kind described and are readily insertible within the same for convenience in setting up the clutch.

In the accompanying drawings, forming a part of this specification, and on which like reference-letters indicate corresponding parts, Figure 1 represents an end view of a clutch with my improvements applied thereto, the shaft being in section and portions being broken away to show the construction; Fig. 2, a longitudinal sectional view of the same and a portion of the surrounding mechanism of a lawn-mower, and Fig. 3 a detached perspective view of the rollers and ring.

The letter A designates the reel-shaft, for instance, of a lawn-mower, on which is loosely mounted a sleeve B, having a pinion C formed thereon and recessed openings D, the outer walls E of which converge toward the center and are adapted to force inward the gripping pieces or rollers F, each mounted in one of said recesses and retained in the desired position relative to the others by a pin G, which serves as a supporting-arbor and is riveted or otherwise secured in a ring H or other member of the clutch loosely fitted around the said shaft. The arbors may be otherwise formed. Each roller or gripping-piece is loosely mounted on its arbor-pin G, whereby it may readily be forced inward to bind upon the shaft A under the converging action of the sleeve B when rotated in the direction of the arrow by means of the ground-wheel I meshing with said pinion. Other means may be employed to rotate said sleeve, or the shaft A may be the driving member and the sleeve B transmit the said rotation to a driven member. It will be seen that each roller has a slight movement sufficient to cause the said binding action between the shaft and sleeve, and yet is held in the desired position by the said ring H, whereby it may be readily inserted within the clutch in setting up the same. Heretofore considerable trouble has been experienced in setting up the machine on account of the difficulty in causing a plurality of rollers or gripping-pieces to retain their adjusted positions within the clutch until all have been inserted in place. By my device each roller or gripping-piece is correctly located with respect to the others and to the operating-surface E, with which it engages, whereby all the rollers or gripping-pieces may be at once inserted within the clutch without the difficulty heretofore experienced. The ring H is retained in said clutch by the end plate J of the lawn-mower or otherwise, and is free to rotate with its rollers or gripping-pieces about the shaft A until the binding action of the sleeve B upon the said rollers and shaft causes the sleeve, the shaft, and the binding mechanism to revolve together in one piece when rotation is given to the pinion in one direction and to break the said engagement on a reverse movement of the same. Another advantage of the ring is that it secures approximately simultaneous action of the said gripping-pieces upon the shaft, thereby preventing undue strain upon some of the gripping-pieces, while others are more or less out of action.

Having thus fully described my invention, what I claim as new, and desire to secure by Letters Patent, is—

1. In a clutch, the combination, with a shaft and a sleeve loosely mounted thereon and having converging recesses, of an interposed gripping-piece having an opening and located within each recess, and a common support having projections adapted to loosely fit said openings in the gripping-pieces and retain them approximately in their relative positions, yet allow a sufficient movement of each piece to and from the shaft and thus secure a gripping action thereon.

2. In a clutch, the combination, with a shaft and a sleeve loosely mounted thereon and having converging recesses, of a gripping-roller having a central opening and located within each recess, and arbors for said rollers loosely fitting the openings therein and supported at fixed distances apart, whereby the said rollers are retained approximately in their relative positions, yet are allowed sufficient movement to and from the said shaft to effect a gripping engagement between the said sleeve and shaft.

3. In a clutch, the combination, with a shaft and a sleeve loosely mounted thereon and having converging recesses, of interposed gripping-pieces mounted in said recesses and each having an opening therein, a rotatable plate adjacent to said gripping-pieces, and pins inserted in said plate at fixed distances apart and loosely fitting the openings in said gripping-pieces and adapted to retain them in said plate in approximately their relative positions.

In testimony whereof I affix my signature in presence of two witnesses.

JOHN C. MILLER.

Witnesses:
J. C. FALCONER,
EDWARD C. MCQUIRK.